(12) United States Patent
Housden et al.

(10) Patent No.: US 8,579,026 B2
(45) Date of Patent: Nov. 12, 2013

(54) SAFETY STRUCTURE FOR DOWNHOLE POWER UNIT TESTING

(75) Inventors: Richard Darrell Housden, Abbeville, LA (US); Kenneth Thomas Black, Lafayette, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 375 days.

(21) Appl. No.: 12/862,665

(22) Filed: Aug. 24, 2010

(65) Prior Publication Data

US 2012/0048540 A1    Mar. 1, 2012

(51) Int. Cl.
*E21B 47/10* (2012.01)
(52) U.S. Cl.
USPC .............. 166/250.08; 166/250.11; 166/242.7; 166/377

(58) Field of Classification Search
USPC ................. 166/317, 250.11, 250.08, 250.17, 166/242.7, 377
See application file for complete search history.

(56) References Cited

U.S. PATENT DOCUMENTS

| | | | |
|---|---|---|---|
| 2,970,470 A * | 2/1961 | Kenneday | 73/152.51 |
| 6,035,880 A | 3/2000 | Gazda | |
| 6,070,672 A | 6/2000 | Gazda | |
| 6,772,835 B2 * | 8/2004 | Rogers et al. | 166/177.4 |

* cited by examiner

*Primary Examiner* — Giovanna Wright
(74) *Attorney, Agent, or Firm* — Haynes and Boone, LLP

(57) ABSTRACT

A safety apparatus for catching a test fixture released from a shaft of a downhole tool during the uphole calibration and testing of the shaft force generation capability of the tool. The safety apparatus includes a hollow body having a distal end that will partially envelope the test fixture to catch the test fixture once the test fixture is released from the downhole tool. The safety apparatus further includes a proximal end portion that is releasably securable to the body of the tool. A method for testing and calibrating the tool is also provided.

21 Claims, 4 Drawing Sheets

SAFETY STRUCTURE FOR DOWNHOLE POWER UNIT TESTING

BACKGROUND OF THE INVENTION

Test fixtures are used in association with downhole tools during the uphole testing of the downhole tools. One such downhole tool is a downhole power unit. A downhole power unit is an electro-mechanical device that is designed to produce a linear force for setting (or pulling) wellbore tools such as monolocks, bridge plugs, packers and the like. A shaft extending axially from the end of the downhole is utilized to transmit this force. The downhole tool is tested uphole prior to insertion downhole to calibrate the tool and ensure that the tool can exert the appropriate amount of force via the shaft as required for a particular application, such as, for example, setting a packer having a 60,000 $lb_f$ activation threshold.

During these tests, using shear pins, the test fixture is attached to the end of the rod extending from the downhole tool. An axial force is applied to the test fixture via the rod until the shear pins fail. As a result of the high testing forces imposed on the test fixture by the rod, the test fixture is forcibly expelled from the downhole tool at a high velocity. Likewise, portions of the shear pins are separated from the test fixture during the process. Both the separated text fixture and the shear pins can present danger to personnel in the area of the tests.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

In general, a downhole tool is operable to selectively generate a linear force that may be used to set wellbore devices such as packers and plugs. The downhole tool is tested uphole prior to insertion downhole to calibrate the tool and ensure that the tool can exert the desired amount of force for a particular application, such as, for example, setting a packer having a 60,000 $lb_f$ activation threshold. As will be described in greater detail below, one or more shear pins are used in the testing process and incorporated in a test fixture to simulate the activation threshold for a particular application. In this example, a plurality of shear pins are used to simulate the 60,000 $lb_f$ activation threshold. The shear pins are selected to shear under application of an axial force once the threshold is reached. For example, twelve shear pins may be used with each shear pin rated at 5,000 $lb_f$ so that the total force required to shear is 60,000 $lb_f$. Upon shearing of the pins, the sheared pins and test fixture are forcibly expelled from the tool at a fairly high velocity. The safety structure of the present invention is positionable on the downhole tool so as to partially surround the test fixture in order to catch and retain the test fixture and the pieces of the shear pins expelled from the tool, thereby enhancing the safety of personnel working near the test site.

Figure 1:
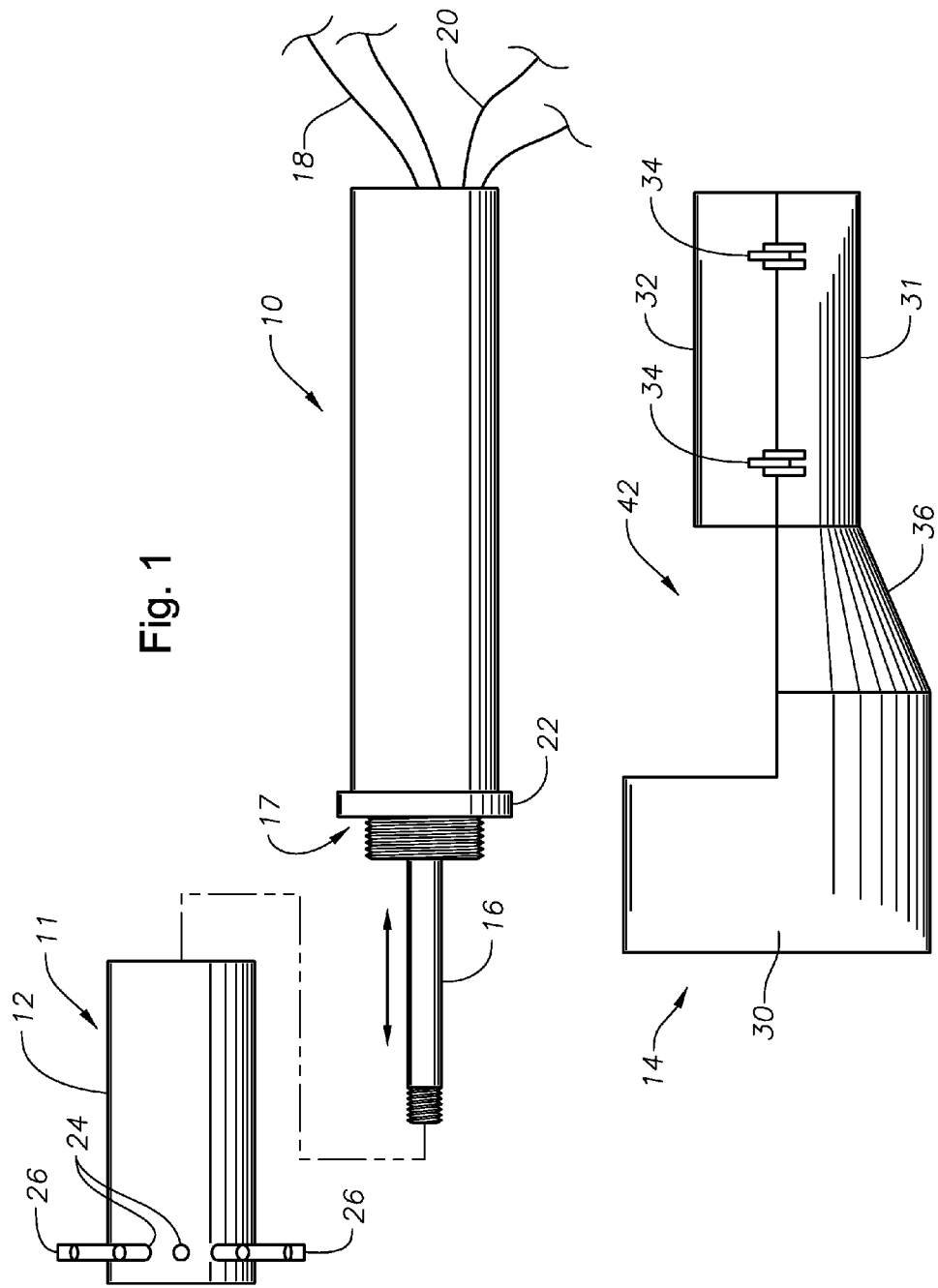
FIG. 1 schematically depicts a downhole power unit and test apparatus for use in the uphole testing of the power unit, the test apparatus including a test fixture and a specially designed safety structure operative to partially surround and catch the test fixture, and associated shear pin portions thereof, when the fixture is released from the power unit during the test.

Referring to FIG. 1, schematically depicted in an exemplary embodiment, is a downhole tool 10 to selectively generate a linear force on a testing apparatus 11. In the exemplary embodiment, the downhole tool 10 is a downhole power unit, however, the downhole tool could be other types of tools consistent with the uses of the safety structure. The testing apparatus 11 includes a test fixture 12 and a safety structure 14. The power unit 10, as is known to one of ordinary skill in the art, is operable to axially extend or retract a rod 16 out of an end 17 of the power unit 10 in order to, for example, operate wellbore devices such as plugs and packers (not shown). The power unit 10 may include electrical power leads 18 and/or data transmission leads 20. During uphole testing, the power unit 10 is preferably supported in horizontal position by suitable stands (not shown), as is known to one of ordinary skill in the art. A collar 22 may be mounted around the end 17 of the power unit 10 in order to aid in the testing of the power unit.

The outer body of test fixture 12 is of a tubular configuration and includes one or more, and preferably a plurality, of radial holes or apertures 24. In one preferred embodiment, sets of radial holes 24 are aligned with one another and positioned to form a ring about the circumference of the test fixture body. The test fixture 12 is configured to retain a piston member (not shown in FIG. 1, but explained in greater detail below) within its interior using shear pins 26 passing through apertures 24. As will be explained in greater detail below, the piston member also is threadingly connected to the rod 16 of the downhole tool 10.

At the distal end, the safety structure 14 includes a cylindrical, hollow test fixture retaining section 30 that is disposed to partially surround the test fixture 12 when the safety structure 14 is mounted on the power unit 10. At the proximal end, the safety structure 14 includes a cylindrical tool mounting section 31. Preferably, the distal end of safety structure 14 is closed while the proximal end of safety structure 14 is open. The safety structure 14 attaches to the power unit 10 through the use of the cylindrical tool mounting section 31 which includes a pivotal side wall portion 32. The side wall portion 32 is secured by hinges 34 and pivots open so that the cylindrical tool mounting section 31 can be disposed around an end portion of the power unit 10. The side wall portion 32 is then closed over the power unit 10 to securely fasten the safety structure 14 to the power unit 10.

Figure 2:
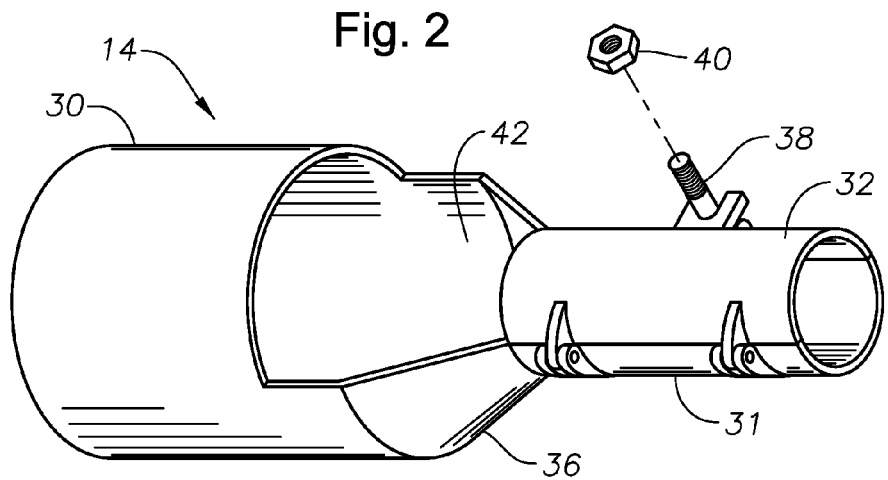
FIG. 2 is a top side perspective view of the safety structure with a pivotally mounted side wall portion thereof in a closed position.

The tool mounting section 31 is shown in FIGS. 1 and 2 with the side wall portion 32 in a closed position. The side wall portion 32 may be secured in a closed position with any suitable fastener, such as for example, the illustrated bolt 38 and nut 40. The tool mounting section 31, i.e., the proximal end of safety structure 14, has a smaller diameter than the cylindrical test fixture retaining section 30, i.e., the distal end of safety structure 14. A frustoconical section 36 connects and supports the tool mounting section 31 to the cylindrical test fixture retaining section 30. An optional top side opening 42 may be provided and extends along the sections 30,31 and 36 as shown. The opening 42 covers approximately 180 degrees of the circumference of the tapered diameter section 36 and the test fixture retaining section 30 and occupies the entire axial length of the tapered diameter section 36 and approximately one-third of the axial length of the test fixture retaining section 30.

The opening 42 aids in the mounting and removal of the safety structure 14 to and from the assembly of the power unit 10 and the test fixture 12. The opening 42 also permits access to and in some embodiments retrieval of the test fixture 12 and shear pins without removing the safety structure 14 from the power unit 10.

Figure 3:
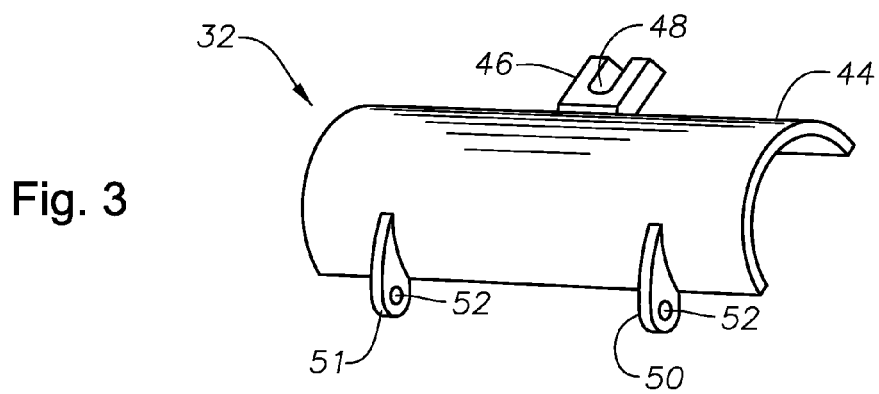
FIG. 3 is a perspective view of the side wall portion removed from the safety structure.

Referring to FIG. 3, the side wall portion 32 includes a half-cylindrical body 44 with a latching mechanism 46, such as a plate, mounted on the exterior of one side near the edge of the axial length wise dimension of the half-cylindrical body 44. In one preferred embodiment, the latching mechanism 46 has a U-shaped opening 48 formed in a plate which opening is configured to receive bolt 38. Mounted on the other edge of the axial length wise dimension of the half-cylindrical body 44 are hinge components, such as plates 50 and 51. Plates 50 and 51 each contain an aperture 52 so as for form hinge 34. Those skilled in the art will appreciate that while side wall portion 32 is preferable for securing safety structure 14 to downhole tool 10, other structures and mechanisms are also suitable for this purposes, such as for example, bands that wrap around the circumference of tool 10.

Figure 4:
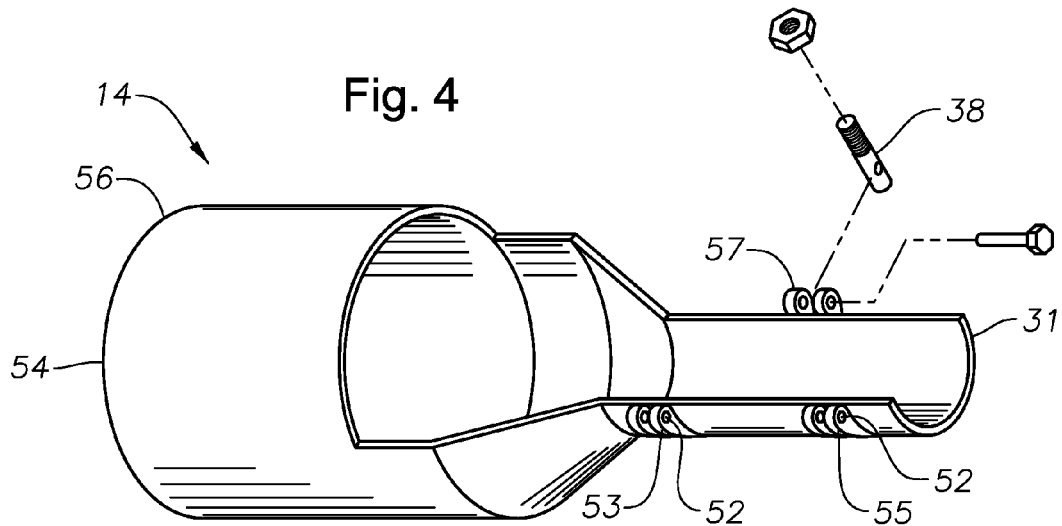
FIG. 4 is a perspective view of the safety structure with the side wall portion removed therefrom.

Referring to FIG. 4, the safety structure 14 is shown with the side wall portion 32 removed. The safety structure 14 may include complimentary hinge elements. In the preferred embodiment, such hinge elements are two pairs of plate sets mounted on the exterior of an edge of the axial length wise dimension of the tool mounting section 31 to form devises 53 and 55. The devises 53 and 55 will receive the two plates 50 and 51 mounted on the side wall portion 32 so that the apertures 52 and the apertures of the devises (not shown) are aligned. A pin (not shown) may then be inserted into the aligned apertures to form the hinges 34.

The safety structure 14 also includes a third pair of plates 57 mounted on the exterior of the other edge of the axial length wise dimension of the tool mounting section 31. The bolt 38 is rotatable mounted within this third pair of plates 57. A circular plate 54 is connected to the rear end of the test fixture retaining section 30 to close the far end 56 of the safety structure 14.

Figure 5:
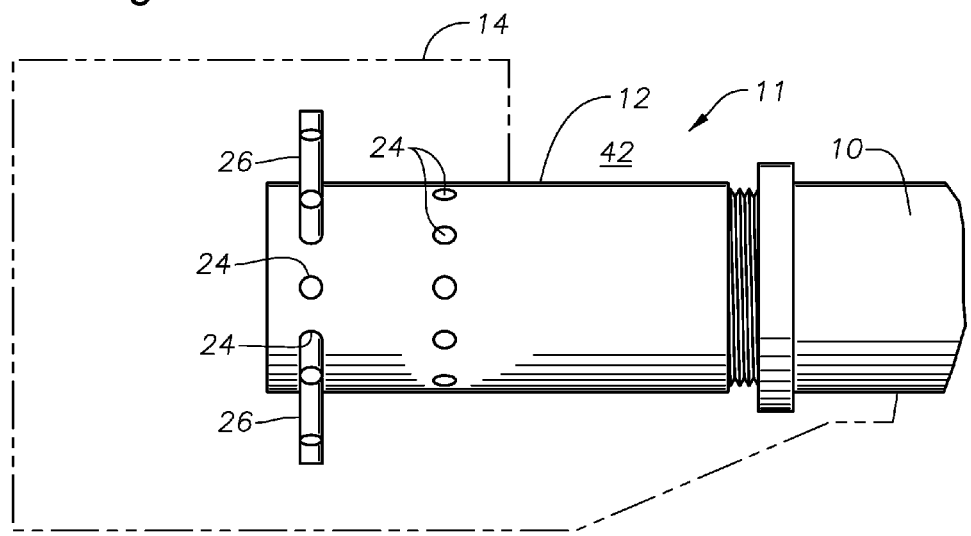
FIG. 5 is a side elevational view of the power unit operatively coupled to the test fixture in preparation for the uphole test of the power unit using the safety fixture, a portion of which is schematically shown in phantom in FIG. 5.
Figure 6:
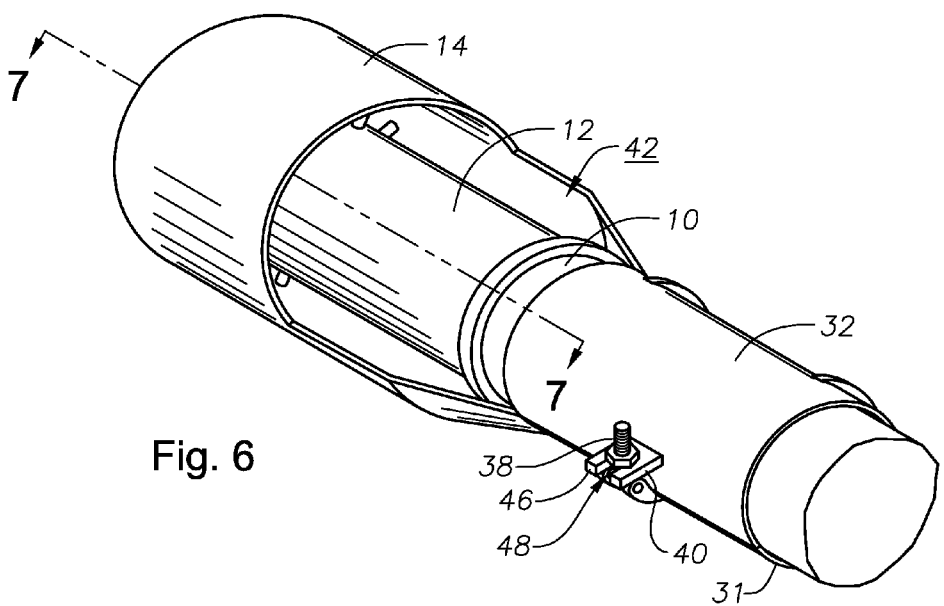
FIG. 6 is a top side perspective view of the power unit/test fixture assembly of FIG. 5 with the safety structure operatively mounted on the power unit and partially surrounding the test fixture.
Figure 7:
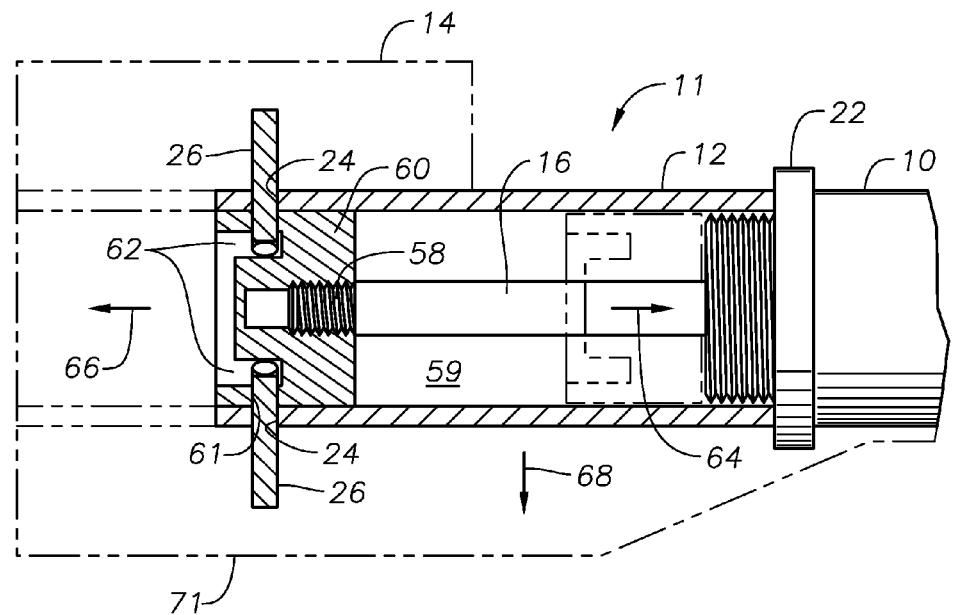
FIG. 7 is an enlarged scale simplified cross-sectional view, partially in elevation and partially in phantom, taken through the FIG. 6 apparatus generally along line 7-7 and illustrating the operation of the test apparatus.
Figure 8:
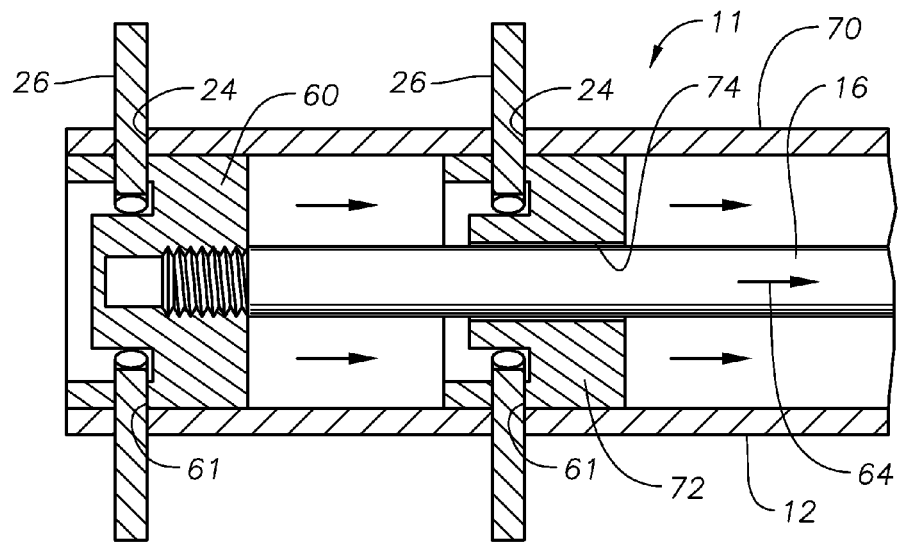
FIG. 8 is a simplified cross-sectional view through an alternative embodiment of the test fixture and illustrates its use in testing the power unit and providing for calibration thereof.

Referring to FIGS. 5-7, in an exemplary embodiment, test fixture 12 is shown attached to power unit 10. Likewise, safety structure 14 (shown in phantom in FIG. 5) is attached to the power unit 10 and positioned to partially surround test fixture 12. FIG. 6 illustrates a top side perspective view of the safety structure 14 operatively mounted on the power unit 10 and partially surrounding the text fixture 12. Power unit rod 16 has an outer end 58 that is threadingly connected to a piston 60 releasably held within the tubular body of the test fixture 12 by the shear pins 26. The interior of the test fixture body has diameter that is larger than the outside diameter of the piston 60, thereby permitting axial movement of piston 60 when not secured in place by shear pins 26. As mentioned above, the tubular body of the test fixture 12 preferably includes a plurality of aligned radial apertures 24 located in a ring about the circumference of the test fixture. As illustrated in FIGS. 5 and 8, there may be two such rings in some embodiments, each set of apertures corresponding to a separate piston secured within test fixture 12. In any event, piston 60 includes a plurality of corresponding apertures 61 for receipt of shear pins 26 when apertures 61 and 24 are aligned. Piston 60 may also include a cavity 62 configured to receive the ends of shear pins 26 that are pressed through the aligned radial apertures 24 and 61. After the shear pins 26 are pressed through the radial apertures 24 of the test fixture 12 and into the corresponding apertures 61 of the piston 60, the piston is secured to the test fixture 12. The rod 16 of the power unit 10 is shown retracted into the power unit 10 so that one end of test fixture 12 abuts the collar 22 of the power unit 10, preferably without interfering with the extended threaded end of tool 10.

The safety structure 14 is mounted to the power unit 10 so that the safety structure 14 partially surrounds test fixture 12, as shown in FIG. 6, by opening the pivotally mounted side wall portion 32 and placing the tool mounting section 31 around a portion of the cylindrical body of the power unit 10. The pivotally mounted side wall portion 32 may then be closed over the power unit 10 and secured in place by engaging bolt 38 with the U-shaped opening 48 of the plate 46 and tightening the nut 40 onto the bolt. The safety structure 14 is positioned on the power unit 10 so that the opening 42 is facing substantially upward relative to the horizontal.

Still referring to FIG. 7, during testing of the power unit 10, the power unit 10 exerts a force to retract the rod 16 within the power unit, in the direction of arrow 64. The test fixture 12, because it is ultimately attached to the rod 16 through the engagement of the rod by the piston 60 and the piston is secured to test fixture 12 via shear pins 26, will then move in the direction of arrow 64 until the end of the test fixture abuts collar 22 of the power unit 10. After the test fixture 12 abuts collar 22 of the power unit 10, continued retraction of rod 16 by the power unit 10 results in an increasing amount of force exerted by the power unit 10 on the piston and shear pins 26 until the axial force exceeds the shear force breaking point of the shear pins 26, thereby causing the shear pins 26 to shear and the piston 60 to be released from its fixed position within test fixture 12. Typically, the amount of force required to shear the shear pins 26 often causes the test fixture 12 to be forcibly expelled, after the shear pins 26 break, in a direction away from the power unit 10, as indicated by directional arrow 66. After pins 26 shear, the piston 60 and rod 16 may continue to move axially in the direction of arrow 64 towards the power unit 10. The movement of the piston 60 in the direction of arrow 64 and the movement of the test fixture 12 in the direction of arrow 66 results in release of the test fixture 12 from engagement with piston 60 and rod 16, such that test fixture 12 will be ejected from the end of power unit 10 and settling within the test fixture retaining section 30 of the safety structure 14. In addition to safely "catching" the expelled test fixture 12, the safety structure 14 also serves to "capture" the pieces of the shear pins 26 after the shear pins break.

Referring to FIG. 8, in another embodiment, a test fixture 70 includes two circumferential rows of aligned radial apertures 24. The two rows of aligned radial apertures 24 allow the use of the piston 60 and a second piston 72 which are both connected to the test fixture 70 through the use of shear pins 26. The second piston 72 has a bore 74 with an internal diameter that is larger than the external diameter of the rod 16, allowing the rod 16 to pass through the second piston 72. The rod 16 is connected in a suitable manner to piston 60, and as described above, may be threadably connected to the piston 60.

Testing of the power unit 10 with the test fixture 70 is similar to the procedure described above. After the rod 16 is retracted within the power unit 10 so that the test fixture 70 abuts the power unit 10, the power unit 10 increases the force on the rod 16 until the shear pins 26 attaching the piston 60 to the test fixture 12 shear and allow piston 60 to move in the direction of arrow 64. The power unit 10 continues to retract rod 16 in the direction of arrow 64 until the piston 60 abuts the second piston 72. The power unit 10 then again increases the force on the rod 16 until the shear pins 26 attaching the second piston 72 to the test fixture 12 shear and allow the piston 60, the second piston 72, and rod 16 to move in the direction of arrow 64.

The use of text fixture 70 along with second piston 72 allows an operator of the power unit 10 to make an initial test and measure, for example, how much electrical current is required in order to shear the shear pins 26 connecting the piston 60 to the test fixture 12. The measured electrical current value then corresponds to a known force value because the force value is known from number of shear pins and the force rating for each shear pin. For example, if twelve shear pins are used and each pin is rated for 5,000 $lb_f$, then the current value measured at the time the shear pins break corresponds to 60,000 $lb_f$. A force regulating device of the power unit 10 can be calibrated to use the measured current value for the known force value. The second piston 72 is attached with an identical number of identical shear pins and a second test is performed with the second piston 72 that allows the operator to verify that the current measured with piston 60 will shear the equivalent rated shear pins on piston 72 and that the power unit 10 is properly calibrated.

While certain features and embodiments of the invention have been described in detail herein, it will be readily understood that the invention encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of describing the invention.

For example, the test fixture is described as cylindrical in shape, although other shapes of the test fixture may be used. In addition, it is not necessary that a piston inside of a cylindrical test fixture be utilized, rather, the rod may be directly connected to the test fixture via shear pins. It is also not necessary that shear pins be utilized to secure the rod (either directly or indirectly) to the test fixture. Devices other than shear pins are contemplated to provide a targeted separation force between rod and the test fixture. For example, test fixture 12 may be provided with an enclosed distal end and one or more bolts having known axial tensile rupture limits may secure the rod to the test fixture. Upon application of an axial force by the rod, the bolts will axially rupture at a known tensile value. Thus, the invention is not limited to a particular type of rupture separation between the test fixture and the power unit.

Likewise, the safety structure need not be of cylindrical construction. The opening 42 need not be provided, rather, a fully enclosed structure could be provided that uses a panel that can be opened to retrieve the test fixture and shear pins following a test. The tool mounting section of the safety structure also does not need to have a pivotally mounted side wall portion in order to attach to the downhole tool, other forms of attaching to the downhole tool are contemplated.

It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A safety apparatus for use with a test fixture released from a movable shaft of a downhole tool during uphole testing of the tool, said safety apparatus comprising:
    a test fixture having a body and a rupture mechanism securing the body of the test fixture to the movable shaft of the downhole tool; and
    a hollow body having (1) a distal end capable of at least partially enveloping the test fixture and limiting axially outward movement of the test fixture released from the movable shaft, wherein the movable shaft is movable relative to the downhole tool, the distal end having a first perimeter and (2) a proximal end capable of being releasably secured to a body of a downhole tool to support said safety apparatus on the tool, the proximal end having a second perimeter smaller than the first perimeter.

2. The safety apparatus of claim 1, wherein the proximal end further comprises a pivotally mounted portion that is operable to releasably secure the proximal end to the body of the downhole tool.

3. The safety apparatus of claim 1, wherein the distal end comprises an opening that allows access to the test fixture when the proximal end is secured to the body of the tool.

4. The safety apparatus of claim 3, wherein the distal end is cylindrical and connects to the proximal end through a frustroconical section; and
    wherein the opening extends from the distal end into at least a portion of the frustroconical section.

5. A method of testing a downhole tool having a body and a shaft axially movable relative to the body, said method being performed uphole and comprising the steps of:
    providing a test fixture having interconnected first and second portions;
    securing the shaft to the second portion;
    at least partially enveloping the test fixture within a safety structure removably secured to the downhole tool body;
    moving the shaft axially relative to the body so as to cause separation of the first and second test fixture portions from one another; and
    retaining the separated first portion within said safety structure.

6. The method of claim 5, wherein the second portion comprises a cylindrical body that is positioned within the first portion and interconnected to the first portion through the use of at least one shear pin extending through the first portion and into the second portion.

7. The method of claim 5, wherein the safety structure comprises:
    a hollow body having a distal end capable of at least partially enveloping the test fixture;
    a proximal end releasably securable to the body of the tool to support said safety structure on the tool; and wherein the distal end comprises an opening that permits access to the test fixture when the proximal end is secured to the body of the tool.

8. The method of claim 5, further comprising positioning a third test fixture portion within the first portion of the test fixture,
wherein the third portion is interconnected with the first portion;
moving the shaft axially relative to the body so as to cause separation of the first and third test fixture portions from one another; and
retaining the separated first portion within said safety structure.

9. An apparatus for performing an uphole test on a downhole power unit having a body with a shaft movable axially relative to the body, said apparatus comprising:
a test fixture having a tubular body within which a piston is releasably restrained against axial movement relative to said tubular body by at least one shear pin extending inwardly through a side wall section of said tubular body and into said piston, said test fixture being operably positionable on the downhole power unit by extending a distal end through the interior of said tubular body and anchoring said distal end to said piston, said tubular body of the operatively positioned test fixture being disconnectable from said piston by forcibly moving the shaft axially relative to the downhole power unit body; and
a safety structure having a hollow body at least partially enveloping the operatively positioned test fixture, being removably securable to the downhole power unit body, and being operative to captively retain the disconnected test fixture within its interior.

10. The apparatus of claim 9, wherein the safety structure further comprises a tool mounting section that includes a pivotally mounted portion that allows the safety structure to be removably securable to the body of the downhole power unit; and
wherein the tool mounting section supports the hollow body capable of at least partially enveloping the operatively positioned test fixture.

11. The apparatus of claim 10, wherein the tool mounting section is cylindrical and connects to the hollow body through a conical section; and
wherein the opening extends from the hollow body into a portion of the conical section.

12. The apparatus of claim 9, wherein the hollow body further comprises an opening in a sidewall of the hollow body that allows access to the test fixture when the proximal end is secured to the body of the tool.

13. The apparatus of claim 9, further comprising a second piston which is releasably restrained against axial movement relative to said tubular body by at least one shear pin extending inwardly through a side wall section of said tubular body and into said second piston, and wherein the distal end of the downhole power unit extends through a bore of the second piston.

14. The apparatus of claim 9, wherein the test fixture further comprises a series of aligned, radial holes around the circumference of the tubular body.

15. An apparatus for performing an uphole test on a downhole power unit, said apparatus comprising:
a downhole power unit having a body with a shaft axially movable relative to the body and extending from said body;
a test fixture secured by a rupture mechanism to the shaft of the downhole tool; and
a safety structure having a hollow body at least partially enveloping the test fixture, said safety structure being removably secured to the downhole power unit body,
the hollow body having (1) a distal end capable of at least partially enveloping the test fixture and limiting axially outward movement of the test fixture released from the power unit shaft, the distal end having a first perimeter and (2) a proximal end releasably secured to the test fixture, the proximal end having a second perimeter smaller than the first perimeter, wherein the rupture mechanism is adjacent the distal end of the hollow body.

16. The apparatus of claim 15, wherein said test fixture further comprises a tubular body with an axially movable piston positioned, therein, wherein said piston is releasably restrained in the tubular body by at least one shear pin extending from the body, and wherein said downhole power unit shaft is attached to said piston.

17. A method of calibrating a downhole tool having a body, and a shaft forcibly movable axially relative to the body, said method being performed uphole and comprising the steps of:
providing a test fixture having interconnected first and second portions that will separate under a known axial force;
positioning a third test fixture portion within the first portion of the test fixture, anchoring the shaft to the second portion,
wherein the third portion is interconnected with the first portion and will separate from the first portion under a known axial force;
at least partially enveloping the test fixture within a safety structure removably secured to the body;
moving the shaft axially relative to the body in a manner so as to cause separation of the first and second test fixture portions;
measuring the amount of electrical current required to separate the first and second test fixture portions; and
calibrating a force regulating device with the measured current value that corresponds to the known force.

18. The method of claim 17, further comprising the steps of:
setting the force regulating device to move the shaft axially relative to the body at the known force; and
forcibly moving the shaft axially relative to the body in a manner separating the first and third test fixture portions and retaining the separated first portion within said safety structure.

19. An apparatus for performing an uphole test on a downhole power unit, said apparatus comprising:
a downhole power unit having a body with a shaft axially movable relative to the body and extending from said body;
a test fixture secured by a rupture mechanism to the shaft of the downhole tool; and
a safety structure having a hollow body at least partially enveloping the test fixture, said safety structure being removably secured to the downhole power unit body,
wherein the rupture mechanism is a shear pin that projects radially outward from the test fixture.

20. The apparatus of claim 19, wherein said test fixture further comprises a tubular body with an axially movable piston positioned, therein, wherein said piston is releasably restrained in the tubular body by at least one shear pin extending from the body, and wherein said downhole power unit shaft is attached to said piston.

21. The apparatus of claim 20, wherein the shear pin extends only partially into the piston.

\* \* \* \* \*